United States Patent Office 3,547,901
Patented Dec. 15, 1970

3,547,901
METALLIZED BIS-FORMAZANES
Paul Lienhard, Riehen, and Fabio Beffa, Basel, Switzerland, assignors to J. R. Geigy A.G., Basel, Switzerland
No Drawing. Filed June 23, 1967, Ser. No. 648,215
Claims priority, application Switzerland, June 27, 1966, 9,294/66
Int. Cl. C09b 45/28, 45/32, 62/08
U.S. Cl. 260—146                              12 Claims

ABSTRACT OF THE DISCLOSURE

Metallized bis-formazanes are described in the molecule of which two formazane moieties, each being metallized with a copper or nickel atom, are linked with each other via a member Q which is an —S—, —SO—, —SO$_2$— or —SO$_2$O— bridge, while in dyestuffs of secondary importance, Q is a divalent, saturated hydrocarbon radical, or the acyl radical of a dibasic organic carboxylic acid or a carbonyl group, or one of the groups —SO$_2$—NR'—, —SO$_2$—NR'—SO$_2$—, or

SO$_2$—NR'—G—NR'—SO$_2$— wherein R' represents hydrogen or lower alkyl and G represents certain alklyene, cycloalkylene or arylene radicals, which bis-formazanes are dyestuffs particularly suitable for the dyeing or printing of textile fiber materials, especially of polyamide and polyurethane fibers, but, especially if they contain fiber-reactive groupings, also of cellulosic fibers, and also of paper, leather and other fibrous materials; furthermore, there are described novel chemical units consisting of fiber molecules chemically linked with radical of the dyestuffs described above, which contain fiber-reactive groupings in their molecules.

---

The aforesaid bis-formazane dyestuffs are distinguished by their great color strength and good wet fastness properties. The dyeings attained therewith are raisin, brown, violet, green, olive, blue-green, blue and grey to black.

DESCRIPTION OF THE INVENTION

The present invention concerns new metallized bisformazanes containing copper or nickel, processes for their production, their use for the dyeing and printing of organic materials, particularly textile materials and, as industrial products, the materials dyed or printed with these formazanes.

The invention provides novel bis-formazanes falling under the general formula

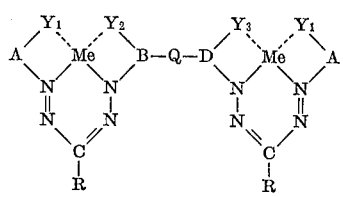

(I)

wherein

A, B and D each represent an aromatic radical of the benzene or naphthalene series containing the group Y$_1$, Y$_2$ or Y$_3$ in o-position to the azo or hydrazone bond, respectively, both A and both Y$_1$ being always of identical structure;
the two Me's represent two copper or two nickel atoms,
R represents a monovalent organic radical,
Y$_1$, Y$_2$ and Y$_3$ each represent hydrogen or a group which is metallized if desired whereby either each of Y$_1$ or Y$_2$ and Y$_3$ must be a metallized group, and
Q represents a divalent, saturated hydrocarbon radical, the acyl radical of a dibasic carboxylic acid or a divalent bridging member containing sulphur, more particularly as defined further below.

In a first aspect, the invention provides fiber-affine-non-reactive dyestuffs which are metallized bis-formazanes of the formula

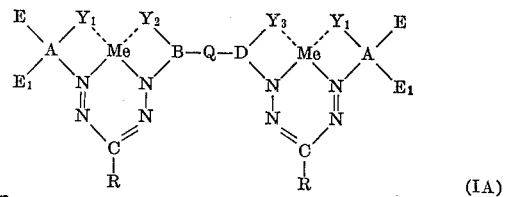

(IA)

wherein

Me represents copper or nickel,
both A's represent identical benzene or naphthalene nuclei exclusively substituted as shown above,
both Y$_1$'s represent identical groups which
  (a) when in complex bond with Me, are in o-position to the substituent

at A, and are selected from the bridges —O—, —COO—, lower alkylsulfonylimino, phenylsulfonylimino and lower alkyl-phenylsulfonylimino; or which
  (b) when not in complex bond with Me, are selected from hydrogen, fluororine, chlorine, bromine, lower alkyl, lower alkyl substituted by fluorine, chlorine or bromine, hydroxy-lower alkyl, lower alkoxy-lower alkyl, carboxy-lower alkyl, cyclohexyl, lower alkoxy, hydroxy-lower alkoxy, phenoxy, phenylthio, lower alkylthio, lower alkanoyl, benzoyl, lower alkylsulfonyl, phenylsulfonyl, phenoxysulfonyl, a grouping of the formula

wherein
  R$_2$ represents hydrogen, lower alkyl, lower alkanoyl, benzoyl, halogenobenzoyl, lower alkylbenzoyl, lower alkoxycarbonyl, lower alkylsulfonyl, phenylsulfonyl, sulfonyl substituted by fluorine, chlorine or lower alkylsulfonyl, and
  R$_3$ represents hydrogen or lower alkyl;
or Y$_1$ represents a grouping of the formula

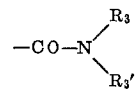

wherein
  each of R$_3$ and R$_3$' represents hydrogen or lower alkyl,
or Y$_1$ represents a grouping of the formula

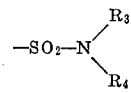

wherein
  R$_3$ has the aforesaid meaning, and
  R$_4$ represents hydrogen, lower alkyl, lower alkanoyl, benzoyl, phenylsulfonyl, lower alkyl - phenylsulfonyl, phenyl, phenyl substituted by flucrine, chlorine or bromine or lower alkylphenyl, E represents
(c) when $Y_1$ represents a group defined under (a): hydrogen, fluorine, chlorine, bromine, nitro, lower alkyl, hydroxy-lower alkyl, lower alkoxy, lower alkylsulphonyl, phenylsulphonyl, chlorophenylsulphonyl, bromophenylsulphonyl, lower alkylphenylsulphonyl, sulfamoylphenylsulphonyl, phenylsulphonyl substituted by $-SO_2^-M^+$; the grouping of the formula

wherein
$R_2'$ represents lower alkanoyl, lower alkenoyl, chloro-lower alkanoyl, bromo-lower alkanoyl, chloro-lower alkenoyl, bromo-lower alkenoyl, benzoyl, chlorobenzoyl, bromobenzoyl, lower alkylbenzoyl or lower alkylsulphonyl; and
$R_3$ represents hydrogen or lower alkyl;
or the grouping

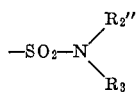

wherein
$R_2''$ represents hydrogen, lower alkyl, cyclohexyl, phenyl, phenyl substittued by fluorine, chlorine, bromine or $$-SO_3^-M^+$$

and
$R_3$ represents hydrogen or lower alkyl; or
(d) when $Y_1$ represents a group as defined under (b): hydrogen, fluorine, chlorine, bromine, nitro or lower alkyl;
$E_1$ represents hydrogen, halogen, nitro, cyano, lower alkyl, $-COO^-M^+$ or $-SO_3^-M^+$;
each of the groupings B and D represents a benzene or naphthalene nucleus exclusively substituted as shown above;
each of $Y_2$ and $Y_3$:
(e) when in complex bond with Me, is in o-position to the respective group and represents

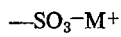

(i) $-O-$ or $-COO-$, when $Y_1$ represents $-O-$, lower alkylsulphonylimino, phenylsulphonylimino or lower alkyl-phenylsulphonylimino, or
(ii) $-O-$, when $Y_1$ represents $-COO-$;
(f) when not in complex bond with Me, each of said $Y_2$ and $Y_3$ represents, hydrogen, fluorine, chlorine, bromine, lower alkyl, $-SO_3^-M^+$, lower alkylsulphonyl or a grouping of the formula

wherein $R_3$ and $R_4$ have the above-stated meanings;
Q represents alkylene of from 1 to 4 carbon atoms, $-CO-$, $-CO-CO-$, $-CO$-alkylene-$CO-$ wherein "alkylene" has at most 4 carbon atoms, $-CO$-alkenylene-$CO-$ wherein "alkenylene" has from 2 to 4 carbon atoms, $-CO-CH=CH-CH=CH-CO$, $-S-$, $-SO-$, $-SO_2-$, $-SO_2-O-$, $-SO_2-NR'-$, $SO_2NR'-SO_2-$ or $-SO_2-NR'-G-NR'-SO_2-$, wherein G represents alkylene of from 2 to 6 carbon atoms, cyclohexylene, phenylene or naphthylene each of which is unsubstituted or substtuted by lower alkyl, chlorine, bromine, $-SO_3H$, lower alkylsulphonyl, or the grouping

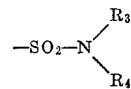

wherein
$R_3$ and $R_4$ have the above-stated meanings and each $R'$ represents hydrogen or lower alkyl,
R represents nitro, cyano, lower alkyl, lower alkenyl, cyclohexyl, lower alkanoyl, benzoyl, chlorobenzoyl, bromobenzoyl, lower alkylsulphonyl, phenylsulphonyl, chlorophenylsulphonyl, bromophenylsulphonyl, lower alkylphenylsulphonyl, lower alkoxyphenylsulphony, nitrophenysulphonyl, N-phenylcarbamoyl, N-chlorophenyl-carbamoyl, N-bromophenylcarbamoyl, N-lower alkoxyphenyl-carbamoyl, benzyl, phenoxy, phenylthio, phenyl, chlorophenyl, bromophenyl, lower alkylphenyl, lower alkoxyphenyl, nitrophenyl, di-lower alkylaminophenyl, N-phenyl-carbamoyl substituted in the phenyl moiety by $-SO^{3-}M^+$, phenyl substituted by $$-SO_3^-M^+$$

phenyl substituted by

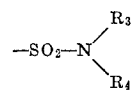

wherein
$R_3$ and $R_4$ have the above-stated meanings, furfuryl, naphthyl, thiophenyl, pyridyl, quinolinyl or benzimidazolyl;
$M^+$ represents the equivalent of a colorless cation; the total number of groupings $-SO_3^-M^+$ and $$-COOM^+$$

together ranging from 0 to 2;
the two negative charges of the above formula which result when both $Y_1$ represent a grouping as defined under (a) and simultaneously $Y_2$ and $Y_3$ represent a grouping as defined under (e), being neutralized by two equivalents of cations $M^+$;
Those of the dyestuffs falling under Formula IA which are free from water-solubilizing groups, and in particular free from the group $-COO^-M^+$ and $-SO_3^-M^+$, are useful especially for the dyeing of synthetic materials of all types such as lacquers, varnishes or acetyl cellulose or synthetic polyamide spinning masses.

Those bis-formazane dyestuffs of Formula IA which contain water solubilizing groups such as carboxylic acid or phosphonic acid and, chiefly, sulphonic acid groups are suitable for the dyeing and printing of leather, paper and fiber material of the most different types, particularly of natural or synthetic polypeptide textile material such as wool, silk, synthetic polyamide and polyurethane fibres. For textile materials of this type, particularly those dyestuffs which are defined in Formula IB, infra; and which contain at most two sulphonic acid groups are used. In many cases they even draw onto these materials from a weakly acid bath. The most preferred subclass, however, comprises those dyestuffs according to the invention, especially as defined in Formula IB, infra, which, apart from those taking part in the complex formation, contain no salt-forming groups which dissociate acid in water, e.g. no carboxylic acid and sulphonic acid groups, but only substituents which promote water solubility, e.g. lower alkylsulphonyl groups, sulphonic acid amide groups which are unsubstituted or substituted by lower alkyl radicals, as well as lower carboxylic acid dialkylamide groups. Preferably, the dyestuffs of Formula IA should contain 1 to 2 sulphonic acid or carboxylic acid groups or 2 to 4 of the other above-mentioned water-solubilizing groups, These dyestuffs have very good affinity to wool and material having dyeing properties similar thereto and they draw onto them completely even from a neutral to weakly acid bath. Sometimes the water solubility of such dyestugs is further increased by admixture with anion active or non-ionogenic wetting or dispersing agents.

Preferred dyestuffs falling under Formula IA are those of the formula

[Formula (IB)]

wherein

Me represents copper, both groupings

[grouping with A, $Y_1$, N]

represent identical radicals having one of the formulas ($\alpha$)

[formula with E, $E_1$, $Y_1$, N]

($\beta$)

[naphthalene with $E_2$, $SO_3H$, O, N]

and ($\gamma$)

[naphthalene with $E_3$, CO—O—, N]

$Y_1$ in the formula ($\alpha$) representing —O—, —CO—O— lower alkylsulphonylimino, phenylsulphonylimino, or lower alkyl-phenylsulphonylimino;

E has the same meaning as given under (c) following Formula IA, $E_1$ have the same meanings as in Formula IA, $E_2$ represents hydrogen, or nitro, $E_3$ represents hydrogen or —$SO_3H$, and each of $Y_2$ and $Y_3$ represents —O—, or, when $Y_1$ represents —O—, lower alkylsulphonylimino or lower alkyl-phenylsulphonylimino, each of $Y_2$ and $Y_3$ represents also —COO—;

Q represents —S—, —SO—, —$SO_2$— or —CO—, and R has the same meaning as in Formula IA.

In particular preferred bis-formazane compounds of Formula IA, >B—$Y_2$ and >D—$Y_3$ are identical.

Preferably, in the last mentioned dyestuffs of Formula IB each of $Y_1$, $Y_2$ and $Y_3$ represents a hydroxyl group or, alternatively, $Y_1$ represents a hydroxyl group and $Y_2$ and $Y_3$ each represent a carboxyl group, or vice versa.

Moreover, in these particularly preferred dyestuffs falling under Formula IB, R is a homocyclic-aromatic or heterocyclic-aromatic radical, particularly a radical of the benzene series such as the phenyl radical, or a radical of the naphthalene series, or a furfuryl radical, all as defined under Formula IA. All carbocyclic aryl components of these substituents symbolised by R can also contain the substituents usual in azo dyestuffs as enumerated in the definition of R in Formula IA.

A second subclass of dyestuffs falling under Formula IA are those of the formula

[Formula (IA')]

wherein

A, Me, Q, R and $E_1$ have the same meanings as in Formula IA and more preferably as in Formula IB, $Y_1$ has the same meaning as defined in (a) following Formula IA, $Y_1$ having preferably the same meaning as in Formula IB, E has the same meaning as defined under (c) following Formula IA, and each of $Y_2$ and $Y_3$ have the same meaning as given under (f) following Formula IA.

A third subclass of compounds falling under Formula IA are those of the formula

[Formula, E, $Y_1$, A, $E_1$, Me, $Y_2$, Q, $Y_3$, Me, $Y_1$, E, $E_1$, with N, C, R]

wherein

A, Me, Q, R and $E_1$ have the same meanings as in Formula IA and preferably as in Formula IB, $Y_1$ has the same meaning as defined in (b) following Formula IA, each of $Y_2$ and $Y_3$ have the same meaning as defined under (e) following Formula IA, and E has the same meaning as defined under (d) following Formula IA.

Particularly valuable, easily accessible copper and nickel containing bis-formazane dyestuffs according to the invention which are distinguished by good dyeing properties contain no salt forming groups which dissociate acid in water and correspond to formula

[Formula (IC) with $A_1$, $Y_1$, $Y_2$, Me, B'—$Q_1$—B', $Y_2$, $Y_1$, $A_1$, $R_1$]

wherein $A_1$ and B' each represent an aromatic radical of the benzene series, $A_1$ being substituted as defined in Formula IB for A, $R_1$ represents a carbocyclic-aromatic radical, particularly a benzene radical, as defined following Formula IA, $Y_1$ and $Y_2$ each represent a metal-forming —O— or —COO— group, of which at least one Y must be —O—, $Q_1$ represents the —$SO_2$— or —CO— group, and Me represents nickel or, preferably, copper.

The bis-formazanes according to the invention are produced by condensing an aldehyde of Formula II

with the hydrazine from an amine of Formula III

and coupling two equivalents of the hydrazone obtained with the tetrazonium compound of a diamine of Formula IV

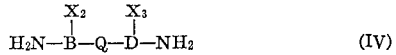

However, first two equivalents of the aldehyde of Formula II can be reacted with the dihydrazine from the tetrazo component of Formula IV to form the dihydrazone and then this can be coupled with two equivalents of the diazonium compound of an amine of Formula III. In the Formulae II, III and IV, A, B, D, Q and R have the meanings given in Formula I, $X_1$, $X_2$ and $X_3$ each represent hydrogen, an optionally metallisable group or a substituent which can be converted into a metallisable group, with the proviso that each of either $X_1$ or $X_2$ and $X_3$ must be a metallisable group or a group which can be converted into such and the groups $X_1$ and $NH_2$ or $X_2$ and $NH_2$ or $X_3$ and $NH_2$ are in o-position to each other.

Another process for the production of the bis-formazane compounds of Formula I consists in that two equivalents of a methylene or methine compound which can be coupled twice while splitting off 1 or 2 groups which can easily be split off or groups which can be converted into such groups, such as the formyl, acetyl, nitrile, carboxylic acid, carboxylic acid ester or carboxylic acid amide group, are coupled in any order desired with two equivalents of the diazonium compound of an amine of Formula III and with one equivalent of the tetrazonium compound of a diamine of Formula IV.

Any diazotisable, primary aromatic amines of the benzene or naphthalene series desired can be used as diazo components of Formula III wherein $X_1$ is hydrogen. Examples are:

1-amino-benzene-2-sulfonic acid,
1-amino-benzene-3-sulfonic acid,
1-amino-benzene-4-sulfonic acid,
1-amino-4-methyl-benzene,
1-amino-4-methoxy-benzene,
1-amino-2-(3'-sulphophenoxy)-benzene,
1-amino-4-fluoro-benzene,
1-amino-2-nitro-benzene-4-sulfonic acid,
1-amino-3-cyano-benzene,
1-amino-3-trifluoromethyl-benzene,
1-amino-5-acetylamino-benzene-2-sulfonic acid,
1-amino-5-chloroacetylamino-benzene-2-sulfonic acid,
1-amino-5-propionylamino-benzene-2-sulfonic acid,
1-amino-5-benzoylamino-benzene-2-sulfonic acid,
1-amino-naphthalene,
1-amino-4-(β-hydroxyethyl)-benzene,
1-amino-4-(β-methoxyethyl)-benzene,
1-amino-(4-carboxymethyl)-benzene,
1-amino-4-cyclohexyl-benzene,
1-amino-2,5-bis-(β-hydroxyethoxy)-benzene,
1-amino-2-phenylthio-benzene,
1-amino-2-phenoxy-benzene,
1-amino-4-methylthiobenzene,
1-amino-4-benzoylamino-benzene,
1-amino-2-phenoxy-sulfonyl-benzene,
1-amino-4-dimethyl-amino-benzene,
1-amino-5-(4'-chlorobenzoylamino)-benzene-2-sulfonic acid,
1-amino-5-(4'-methylbenzoylamino)-benzene-2-sulfonic acid,
1-amino-5-(methoxycarbonylamino)-benzene-2-sulfonic acid,
1-amino-5-(phenylsulfonylamino)-benzene-2-sulfonic acid,
1-amino-4-(4'-chlorophenylsulfonylamino)-benzene-2-sulfonic acid,
1-amino-4-(4'-methylphenylsulfonylamino)-benzene-2-sulfonic acid,
1-amino-4-carbamoyl-benzene,
1-amino-4-(N-methylcarbamoyl)-benzene,
1-amino-4-(N,N-dimethyl-carbamoyl)-benzene,
1-amino-3-sulfamoyl-benzene,
1-amino-3-(N-methylsulfamoyl)-benzene,
1-amino-3-(N,N-diethyl-sulfamoyl)-benzene,
1-amino-3-(N-phenyl-sulfonyl-sulfamoyl)-benzene,
1-amino-3-[N-(4'-methylphenyl-sulfonyl)-sulfamoyl]-benzene,
1-amino-3-(N-phenylsulfamoyl)-benzene,
1-amino-3-[N-(2'-chlorophenyl)-sulfamoyl]-benzene,
1-amino-3[N-(4'-methylphenyl)-sulfamoyl]-benzene,
1-amino-2,4,6-trimethyl-benzene,
1-amino-2,4,6-trichloro-benzene,
1-amino-2,4,6-tribromo-benzene,
1-amino-2-chloro-4,6-dinitro-benzene.

As diazo components of Formula III wherein $X_1$ is a metallisable group, advantageously o-hydroxyaminobenzene and o-hydroxyaminonaphthalene compounds as well as o-aminocarboxylbenzene and o-aminocarboxylnaphthalene compounds usual for the production of metallisable azo dyestuffs are used. Examples are:

1-hydroxy-2-amino-4-chlorobenzene,
1-hydroxy-2-amino-4-bromobenzene,
1-hydroxy-2-amino-4,6-dinitro-benzene,
1-hydroxy-2-amino-4-methyl-benzene,
1-hydroxy-2-amino-4-amyl-6-nitro-benzene,
1-hydroxy-2-amino-4-cyano-benzene,
1-amino-2,5-dimethoxybenzene,
1-hydroxy-2-amino-4-(4'-chlorophenyl-sulfonyl)-benzene,
1-hydroxy-2-amino-4-(4'-bromophenylsulfonyl)-benzene,
1-hydroxy-2-amino-4-(4'-methylphenylsulfonyl)-benzene,
1-hydroxy-2-amino-4-benzoylamino-benzene,
1-hydroxy-2-amino-4-(N-cyclohexyl-sulfamoyl)-benzene,
1-hydroxy-2-amino-4-(N-phenyl-sulfamoyl)-benzene,
1-hydroxy-2-amino-4-[N-(4'-chlorophenyl)-sulfamoyl]-benzene,
1-hydroxy-2-amino-4-[N-(4'-methylphenyl)-sulfamoyl]-benzene,
2-aminonaphthalene-3-carboxylic acid,
2-amino-3-carboxynaphthalene-6-sulfonic acid,
2-hydroxy-1-aminonaphthalene-4-sulfonic acid, and
6-nitro-2-hydroxy-1-aminonaphthalene-4-sulfonic acid.

Dyestuffs of Formula IA produced with the last-mentioned naphthalene derivative can be converted by reduction of the nitro group in 6-position and acylation of the resulting 6-amino substituent, with acetic anhydride to the corresponding 6-acetylamino-substituted dyestuff, or with benzoyl chloride to the corresponding 6-benzoylamino-substituted dyestuff, or with methane-sulfonyl chloride to the corresponding 6-methylsulfonylamino-substituted dyestuff or with toluene-sulfonyl chloride to the corresponding 6-toluene-sulfonylamino-substituted dyestuff.

Examples of diazo components of Formula III containing a substituent in the o-position which can be converted into a metallisable group are:

1-amino - 2 - bis-(alkylsulphonyl- or arylsulphonyl)-amino-benzenes, e.g. 1-amino-2-bis-(methylsulphonyl-, phenylsulphonyl- or 4'-methylphenylsulphonyl)- amino-benzenes as well as the corresponding 4-chloro-, 4-alkyl- or 4-alkoxy-substituted benzene compounds which can be diazotised, coupled and, depending on the intended use, can be saponified under mild alkaline conditions before or after formation of the bis-formazane, to form the corresponding o-monosulphonylamino compounds.

The diazo components of Formula III can also be used in mixtures of two different diazotisable amines. In this case mixtures of symmetrical and unsymmetrical bis-formazane compounds of Formula I are obtained.

As tetrazo components of the Formula IV especially diaminodiphenyl derivatives are used which, between the two benzene nuclei as bridging member Q, contain a —$CH_2$—, —CO—, —$SO_2NH$—$(CH_2)_{2-3}$—NH—$SO_2$— and, preferably, an —$SO_2$— group and, as metallisable groups $X_2$ and $X_3$, each in the o-position to the amino groups, contain a hydroxyl or a carboxyl group. As examples of such diamines can be mentioned:

4,4'-dihydroxy-3,3'-diamino-diphenylmethane,
3,3'-diamino-diphenylmethane-4,4'-dicarboxylic acid,
4,4'-dihydroxy-3,3'-diamino-benzophenone,
4,4'-dihydroxy-3,3'-diamino-diphenyl sulphone,
3,3'-diamino-diphenylsulphone-4,4'-dicarboxylic acid,
N,N'-di-(3-amino-4-hydroxybenzenesulphonyl)-ethylenediamine,
N,N'-di-(3-amino-4-hydroxybenzenesulphonyl)-propylene-1,3-diamine,
N,N'-di-(3-carboxy-4-aminobenzenesulphonyl)-ethylenediamine,
N,N'-di-(3-carboxy-4-aminobenzenesulphonyl)-propylene-1,3-diamine,
N,N'-di-(4-hydroxy-3-aminobenzenesulphonyl)-hexylene-1,6-diamine,
N,N'-di-(4-hydroxy-3-aminobenzenesulphonyl)-cyclohexylene-1,4-diamine,
N,N'-di-(4-hydroxy-3-aminobenzenesulphonyl)-phenylene-1,4-diamine,
N,N'-di-(4-hydroxy-3-aminobenzenesulphonyl)-napthylene-1,5-diamine,
N,N'-dimethyl-N,N'-(3-amino-4-hydroxybenzene-sulphonyl)-ethylene-diamine.

For the production of bis-formazane compounds of Formula I, tetrazo components of Formula IV wherein $X_2$ and $X_3$ do not represent metallisable groups are used which, in the metallisation, yield dyestuffs containing two dicyclic formazane complexes. Examples are:

4,4'-diaminodiphenylmethane,
4,4'-diaminodiphenylsulphone,
4,4'-diaminodiphenylethane,
4,4'-diaminodiphenylsulphide,
3,3'-diaminodiphenylsulphone,
N,N' - di - (3' - aminophenyl) - 5 - sulpho - phenylene-1,3-diamine,
N,N' - di - (3' - aminophenyl) - 2 - chloro - 5 - sulpho-phenylene-1,3-diamine,
N,N' - di - (3' - aminophenyl) - 2 - methyl - 5 - sulpho-phenylene-1,3-diamine,
N,N' - di - (3' - aminophenyl) - 5-sulphamoyl-phenylene-1,3-diamine,
N,N' - di - (3' - aminophenyl) - 5 - methylsulphonyl-phenylene-1,3-diamine,
N,N' - di - (3' - aminophenyl) - 5 - (N,N-dimethyl-sulphamoyl)-phenylene-1,3-diamine,
3,3' - diamino - 4,4' - dichloro-diphenylsulphone,
3,3' - diamino - 4,4' - dibromo-diphenylsulphone,
3,3' - diamino - 4 - chloro - 4' - methyl-diphenylsulphone,
2,3' - diamino - 4 - methyl - 4' - chloro-diphenylsulphone,
4,4' - diamino - 2 - sulpho - diphenylamine,
3 - N - (3' - sulpho - 4' - amino-phenyl) sulphamoyl-1-amino-benzene,
1 - amino - 2 - (4' - aminophenylthio) - 5 - methyl-sulphonyl-benzene,
1 - amino - 2 - (4' - aminophenylthio) - 5 - sulphamoyl-benzene,
1 - amino - 2 - (4' - aminophenylthio) -5 - (N,N-di-methylsulphamoyl)-benzene,
4,4'-diamino-dibenzoyl,
4,4'-diamino-dibenzoyl-methane,
4,4'-diamino-dibenzoyl-butane,
4,4'-diamino-diphenyl-sulphoxide,
1 - amino - 3 - (3' - aminophenoxy-sulphonyl)-benzene.

Aldehydes of Formula II used for the hydrazone production are chiefly carbocyclic-aromatic as they lead to the particularly valuable dyestuffs containing two meso-arylformazane groupings. Examples of such arylaldehydes are: benzaldehyde, 2-, 3- or 4-methyl benzaldehyde, 4 - methoxy benzaldehyde, 3 - nitrobenzaldehyde, 2- or 4- chloro-benzaldehyde, 3,4-dichlorobenzaldehyde, 4-dimethylaminobenzaldehyde or 4 - diethylamino - benzaldehyde, 4 - sulphamylbenzaldehyde, 1- or 2-naphthaldehyde, 2,6 - dichlorobenzaldehyde, 4 - bromo - benzaldehyde, 2- and 3- sulphobenzaldehyde, 4 - (N - methylsulphamyl)- and 4 - (N,N - dimethylsulphamyl)-benzaldehyde, α-naphthaldehyde.

Also heterocyclic aldehydes, e.g. furfurol, thiophene-2-aldehyde, 2- and 4-pyridine aldehyde, quinoline-2-aldehyde and benzimidazole - 2 - aldehyde can be used. In addition, aliphatic or araliphatic aldehydes can also be used, e.g. acetaldehyde, crotonaldehyde, butyraldehyde, enanthaldehyde, phenacetaldehyde, cinnamaldehyde, hexahydro-benzaldehyde.

The usual, advantageously water-soluble, simple or complex nickel or copper salts of organic or inorganic acids are used for the metallisation of the metal-free bis-formazane compounds of Formula I. Preferably the water-soluble nickel and, mainly, copper salts of mineral acids or of low fatty acids are used such as copper sulphate or copper acetate. When copper or nickel salts of mineral acids are used, the metallisation is advantageously performed in the presence of a mineral acid buffering agent; as such particularly alkali metal hydroxides or carbonates or alkali metal salts of low fatty acids such as alkali metal acetates, or alkali metal salts of polybasic phosphoric acids, ammonia or tert. nitrogen bases, e.g. pyridine bases, are used. When complex salts of nickel or copper are used, optionally components thereof bound in complex linkage can be contained in the end product.

The agent introducing heavy metal is used in at least equivalent amounts so that per mol of bis-formazane compound there are at least two atoms of heavy metal present. The metallisation is completed usually even at room temperature; in many cases however, slight heating, e.g. up to about 80° C., is required. Without chelating agent, the metallisation is performed advantageously at pH values of from 4 to 8 whilst in the presence of chelating agents such as tartaric or citric acid or ammonia, it is preferably performed at a pH of between about 8 to 14.

A modification of the process according to the invention for the production of copper or nickel complexes of bisformazane compounds of Formula I consists in treating a metallisable hydrazone compound of Formula V or VI

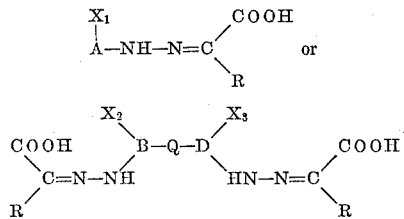

wherein A, B, D, Q and R have the meanings given in Formula I, and each of $X_1$, $X_2$ and $X_3$ represents a metallisable group, and the groups $X_1$ and A, or $X_2$ and B, or $X_3$ and D, are in o-position to each other, first with an agent giving off copper or nickel and then coupling with the tetrazonium compound of a diamino compound of the Formula IV

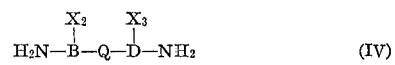

or with the diazonium compound of an amine of Formula III

in which Formulae III and IV

A, B, D, Q and R have the meanings given in Formula I, each of $X_1$, $X_2$ and $X_3$ represents hydrogen, an optionally metallisable group or a substituent which can be converted into a metallisable group, and the groups $X_1$ and $NH_2$, or $X_2$ and $NH_2$, or $X_3$ and $NH_2$ are in o-position to each other, to form the metal-containing bis-formazane dyestuff and, if necessary, saponifying.

When, in this modified process, amines of Formula III or IV, particularly the diazo components of Formula III which contain, e.g. a dialklsulphonylamino or diarylsulphonylamino group as substituent $X_1$ or $X_2$ and $X_3$ which can be converted into a metallisable group, are used, then the metal-containing bis-formazane dyestuffs formed after the coupling should then be saponified while splitting off an alkylsulphonyl or arylsulphonyl group.

Each of both the hydrazones of Formula or the dihydrazones of Formula VI as well as the amines of Formula III or the diamines of Formula IV can be used as uniform compounds or as mixtures of two or more corresponding compounds.

The compounds of Formulae V and VI are obtained by coupling the diazonium compound of an amine of Formua III or of the tetrazonium compound of an amine of Formula IV, in which Formulae III and IV, $X_1$, $X_2$ and $X_3$ each represent a metallisable group or a group which can be converted into such, with a methylene or methine compound which, on completion of the coupling, also contains a carboxyl group or a substituent which can be converted into such at the methine carbon atom, e.f. a cyano or carboxylic acid ester group and, if necessary, converting the substituent which can be converted into the carboxyl group into the latter.

In this modified process, the metallisation, the second coupling and, sometimes. the saponification of a dialkylsulphonylamino or diarylsulphonylamino group can also be performed in a single step. If the medium is sufficiently alkaline, then also the cyano or carboxylic acid ester group can be saponified immediately previously in the same reaction medium.

Amines of Formulae III and IV suitable for this embodiment of the invention have been given in the description of the first process.

As methylene or methine compounds capable of double coupling which, on completion of the coupling, also contain a carboxyl group or a group which can be converted into such at the methine carbon atom, are used, e.g. ethyl acetoacetate, ethyl cyanoacetate, ethyl nitroacetate, ethyl α - benzoylacetoacetate, ethyl α - (p-chlorobenzoyl)-acetoacetate, ethyl α-(p-bromobenzoyl)-acetoacetate, as well as the corresponding nitrile, ethyl benzoylacetice, ethyl methylphenylformyl acetate, phenylcyanoacetice acid, ethyl phenyl-cyanoacetate, phenyl cyanoacetic acid amide, ethyl α-phenyl acetoacetate, α-phenylacetoacetic acid nitrile, dimethyl α-phenyl oxalacetate, ethyl phenylcyano-pyruvate, ω-phenyl-ω-cyanoacetophenone, 2-phenyl indandione-(1,3) or also ethyl α-naphthylformyl-acetate, ethyl methylsulphonylacetate, ethyl phenylsulphonyl-acetate, ethyl (4-chlorophenylsulphonyl)-acetate, ethyl (4-bromophenylsulphonyl)-acetate, ethyl (4-methylphenylsulphonyl)-acetate, ethyl (4-methoxyphenylsulphonyl) - acetate, ethyl (3 - nitrophenylsulphonyl)-acetate, acetoacetice acid anilide, acetoacetic acid 2-chloro-anilide, acetoacetic acid 4- bromoanilide, acetoacetic acid 4-methyl-anilide, acetoacetic acid 4-methoxy-anilide, ethyl α-benzyl-acetoacetate, ethyl α-phenoxy - acetoacetate, and ethyl α - phenylthio-acetoacetate.

Naturally, the conditions given in the description of the first process are valid for the coupling and metallisation to form the copper and nickel complexes of the bis-formazane compounds of Formula I according to the invention also in the subsequently described processes.

These bis-formazane metal complexes obtained by the above-described processes can be uniform compounds or mixtures of two or more compounds as defined.

The heavy metal-containing formazane dyestuffs thus produced are worked up and isolated by conventional methods. Sometimes a subsequent purification should be made to remove undesirable side products, e.g. by dissolving and recrystallising the bis-formazane products.

In another aspect, the invention provides fiber-reactive dyestuffs which are metallized bis-formazanes falling under Formula I, but further substituted by a fiber-reactive grouping, and particularly those falling under the formula

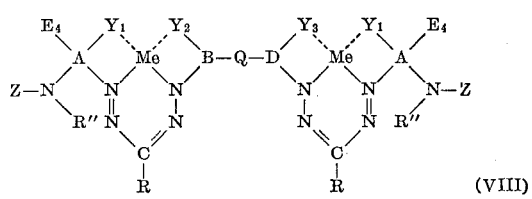

(VIII)

wherein

Me represents copper or nickel, both A's represent identical benzene or naphthalene nuclei exclusively substituted as shown in the above Formula VIII both $Y_1$'s represent identical groups which
  (a) when in complex bond with Me are in o-position to the substituted

and are selected from —O—, —COO—, lower alkylsulphonylimino, phenylsulphonylimino or lower alkylphenylsulphonylimino or which,
  (b) when not complex-bonded to Me, are selected from hydrogen, fluorine, chlorine, bromine, lower alkyl, lower alkyl substituted by fluorine, chlorine or bromine, the grouping —$SO_3^-M^+$ or the grouping.

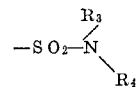

wherein
  $R_3$ represents hydrogen or lower alkyl, and
  $R_4$ represents hydrogen, lower alkyl, lower alkanoyl, benzoyl, phenylsulphonyl, lower alkyl-phenylsulphonyl, phenyl, phenyl substituted by fluorine, chlorine or bromine or lower alkylphenyl;

$E_4$ represents:
  (c) when $Y_1$ represents a group defined under (a) following Formula VIII: hydrogen, fluorine, chlorine, bromine, lower alkyl, —$SO_3^-M^+$, or the grouping

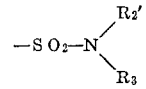

wherein
  $R_2'$ represents hydrogen, lower alkyl, cyclohexyl or phenyl, and
  $R_3$ represents hydrogen or lower alkyl; or
  (d) when $Y_1$ represents a group as defined under (b) following Formula VIII, only hydrogen;

each of the groupings B and D represents a benzene or naphthalene nucleus exclusively substituted as shown in Formula VIII above;

each of $Y_2$, $Y_3$, Q and R have the same meanings as in Formula IA, $M^+$ represents the equivalent of a colorless cation; the total number of groupings —$SO_3^-M^+$ and —$COO^-M^+$ together ranging from 2 to 6;

the two negative charges of the above formula which result when both $Y_1$'s represent a grouping as defined under (a) and simultaneously $Y_2$ and $Y_3$ represent a grouping as defined under (e) following Formula IA, being neutralized by two cation equivalents M⁺; and Z represents a fiber-reactive grouping.

When Z in Formulae VIII and IX, infra, containing a quaternized nitrogen atom, the aforesaid two negative charges are compensated by the positive charges of the two Z-groups.

Further fiber-reactive bis-formazanes falling under this second aspect of the invention are those of the formula

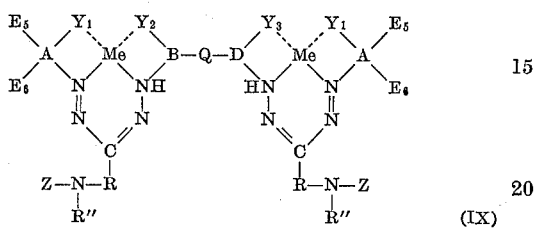

(IX)

wherein

A, B, D, Y₁, Y₂, Q, Me, Z have the same meanings as in Formula VIII;

both Y₁ represent identical groups which
  (a) when in complex bond with Me, are in ortho-position to the respective substituent

A, and are selected from —O—, —CO—O—, lower alkylsulphonylimino, phenylsulphonylimino and lower alkylphenylsulphonylimino, or which
  (b) when not complex-bonded to Me, are selected from hydrogen, fluorine, chlorine, bromine, lower alkyl, lower alkyl substituted by fluorine, chlorine or, lower alkoxy, nitro, the grouping bromine —SO₃⁻M⁺, lower alkylsulphonyl, phenylsulphonyl or the grouping

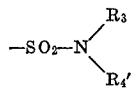

wherein
  R₃ represents hydrogen or lower alkyl, and
  R₄' represents hydrogen, lower alkyl, cyclohexyl, phenyl, phenyl substituted by fluorine or lower chlorine or bromine alkylphenyl;

E₅ represents:
  (c) the same substituents as represented by Y₁ in the definition given under (b) following Formula IX, when Y₁ represents a group as defined under (a) following Formula IX;
  (d) hydrogen, fluorine, chlorine, bromine, or lower alkyl, when Y₁ represents a group defined under (b) following Formula IX; and E₆ represents hydrogen, halogen, nitro, cyano, lower alkyl, —COO⁻M⁺ or —SO₃⁻M⁺; M⁺ having the same meaning as in Formula VIII and the total number of groupings —SO₃⁻M⁺ and —COO⁻M⁺ together being in the same range as in Formula VIII;

R represents benzoyl, phenylsulphonyl, N-phenylcarbamoyl, benzyl, phenoxy, phenylthio, phenyl or naphthyl;

R" in Formulas VII and IX represents hydrogen or lower alkyl; and the two negative charges of the above Formula IX which result when both Y₁ represent a grouping as defined under (a) following Formula IX and simultaneously Y₂ and Y₃ represent a grouping as defined under (e) following Formula IA being neutralized by two cation equivalents M⁺.

More in particular, fiber-reactive grouping Z in Formulas VIII and IX represents (a) a radical of the formula

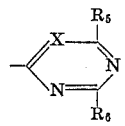

wherein
X represents

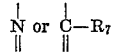

and, when X is

R₅ represents fluorine, chlorine, bromine, tri-lower alkyl-ammonio, a group of the formula

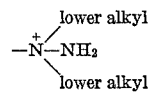

or the radical

or the radical

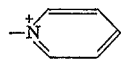

R₆ represents the same as R₅ or lower alkoxy, phenoxy, amino, mono-lower alkylamino, di-lower alkyl-amino, phenylamino or sulphophenylamino; and, when X is

each of R₅ and R₆ repreents fluorine, chlorine or bromine; and R₇ represents hydrogen, halogen, lower alkyl, lower alkanoyl, cyano, nitro, phenyl, N-phenylcarbamoyl or phenylsulphonyl, (b) a radical of one of the formulas

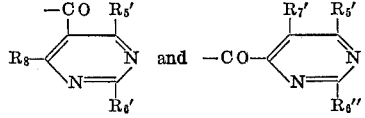

wherein
  R₇' represents hydrogen or fluorine, chlorine, bromine, and
  each of R₅' and R₆' represents fluorine, chlorine, bromine , tri-lower alkylammonio, the grouping

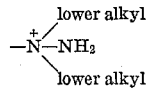

the radical

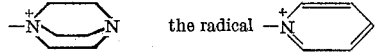

or the group —SO₃⁻M⁺,
  R₆" represents fluorine, chlorine or bromine, and
  R₈ represents hydrogen or lower alkyl;

(c) 2,3-difluoro-, -dichloro- or -dibromo-quinoxaline-6-carbonyl, (d) 2,3-difluoro-, -dichloro- or -dibromo-quinoxaline-6-sulphonyl, (e) 1,4-difluoro-, -dichloro- or -dibromo-phthalazine-6-carbonyl, (f) 2,4-difluoro-, -dichloro- or -dibromo-quinazoline-6-carbonyl, (g) 2,4-difluoro-, -dichloro- or -dibromo-quinazoline-7-carbonyl, (h) [4',5'-difluoro-, -dichloro- or -dibromo - 6' - pyridazonyl-(1')]-lower alkanoyl, (i) p-[4',5'-difluoro-, -dichloro- or -dibromo-6'-pyridazonyl-(1')]-benzoyl;
(k) a heterocyclic radical of the formula

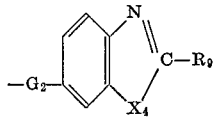

wherein
R₉ represents fluorine, chlorine, bromine or $-SO_3^-M^+$,
G₂ represents —CO— or —SO₂—, and
X₄ represents sulphur or oxygen;
(1) a radical of the formula

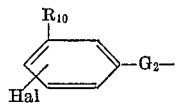

wherein
R₁₀ represents nitro, lower alkylsulphonyl or phenylsulphonyl, or a group

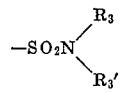

Hal represents fluorine or chlorine in ortho- or paraposition to G₂, and
G₂ has the same meaning as under (k), supra;
R₃ and R₃' having the same meanings as in Formula IA;
(m) α-fluoro-, α-chloro- or α-bromo-lower alkanoyl;
(n) α,β-difluoro-, -dichloro- or dibromo-lower alkanoyl;
(o) lower alkenoyl;
(p) mono-fluoro-, -chloro- or -bromo-lower alkenoyl; or
(q) difluoro-, -dichloro- or -dibromo-lower alkenoyl.

The fiber-reactive dyestuffs according to the invention and especially those of Formulas VIII and IX are useful for the dyeing of cellulose material such as staple fibre, jute, ramies, hemp and, chiefly, cotton. In general, to attain sufficient solubility these fiber-reactive dyestuffs should contain in the molecule at least two, preferably 4 to 6, water solubilising groups which dissociate acid in water such as sulphonic acid or carboxyl groups.

Fibre reactive groupings Z, i.e. groups which can enter into a chemical bond with the fibre molecules, are introduced into the bis-formazane molecule by conventional conversion reactions during the various stages of the process for the production of the metal complexes. These conventional conversion reactions comprise, e.g. the reaction of a component containing an acylatable amino group with acids or with reactive derivatives of acids which contain, in the acid radical, a substituent which can be split off as anion such as a mobile fluorine, chlorine or bromine atom or an exchangeable sulphonic acid group, or a polylinkage which is capable of addition. The following are used, preferably, as such acylating agents:

(a) Symmetrical triazine compounds containing at least two fluorine, chlorine or bromine atoms bound to carbon atoms such as cyanuric chloride, cyanuric bromide, also primary condensation products of cyanuric chloride or cyanuric bromide with ammonia, amines, alkanol, alkylmercaptans, phenols or thiophenols;

(b) Pyrimidines containing at least two reactive fluorine, chlorine or bromine atoms such as 2,4,6-trichloro- or 2,4,6-tribromo- pyrimidine, 2,4,5,6-tetrachloro- or 2,4,5,6-tetrabromo- pyrimidine;

(c) Fluoro-, chloro- or bromo-pyrimidine carboxylic acid halides such as 2,4-dichloropyrimidine-5- or -6- carboxylic acid chloride;

(d) 2,3-difluoro-, -dichloro- or -dibromo-quinoxaline carboxylic acid halides such as 2,3-dichloroquinoxaline-6-carboxylic acid chloride, and (e) 2-fluoro-, 2-chloro- or 2-bromo-benzothiazole carboxylic acid halides such as 2-chlorobenzothiazole-5- or -6- carboxylic acid chloride.

The new bis-formazane dyestuffs according to the invention are distinguished by their great colour strength and, in some cases, by their pure shades. The dyeings attained therewith are raisin, brown, violet, green, olive, blue-green, blue, grey to black. Wool dyeings are thus particularly distinguished by good fastness to light and rubbing and outstanding wet fastness properties, e.g. good fastness to washing alkali milling, sea water, decatising and perspiration. In addition, the dyeings are level.

In this specification and in the appended claims, the term "lower" applied to "alkyl," "alkenyl," "alkoxy" or "alkenyloxy" means such groups or moieties having 1 to 5 carbon atoms, and applied to "alkanoyl" and "alkoxycarbonyl" it means such groups or moieties having 2 to 5 carbon atoms, unless expressly stated otherwise.

Particularly preferred fiber-affine and fiber-reactive dyestuffs falling under Formulas IA, VIII and IX are those in which both Y₁'s represent identical metal-bonding groups as defined under (a) and each of Y₂ and Y₃ represents a metal-bonding group as defined in the said three formulas, and R represents phenyl, chlorophenyl, bromophenyl, lower alkylphenyl, lower alkoxyphenyl, nitrophenyl, di-lower alkylaminophenyl, phenyl-substituted by $-SO_3^-M^+$, phenyl-substituted by

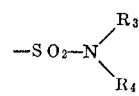

wherein R₃ and R₄ have the abovestated meanings, or naphthyl.

Most preferred bridging groups Q in these preferred dyestuffs are —SO₂— and —CO—.

The following non-limitative examples illustrate the invention further. The temperatures are given therein in degree centigrade. Percentages are by weight unless expressly stated otherwise.

Example 1

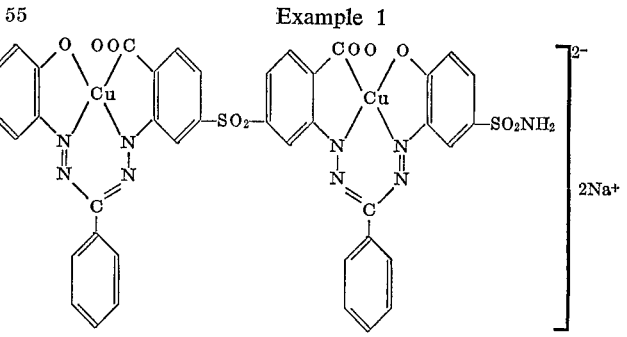

18.8 g. of 1-hydroxy-2-aminobenzene-4-sulphonic acid amide are diazodised at 0–10° with 6.9 g. of sodium nitrite and 30 ml. of 10 N hydrochloric acid. The brown suspension of the diazonium compound is neutralised with sodium bicarbonate until congo paper no longer turns blue, whereupon it is added to the solution of 20 g. of phenyl formyl acetic acid ethyl ester in 200 ml. of ethanol and 10 ml. of 10 N sodium hydroxide solution. The mixture is made alkaline with sodium hydroxide solution so that phenolphthalein paper turns red and then it is stirred until the coupling is complete.

The coupling mixture is then heated to 50°, 70 ml. of 10 N sodium hydroxide solution are added, it is kept for 30 minutes at 50–50° and again cooled to room temperature. First 16.8 g. of tartaric acid are added to the brown solution so formed, then 100 ml. of 1 m. copper sulphate solution are added dropwise, then the tetrazonium compound from 16.8 g. of 3,3'-diamino-4,4'-dicarboxydiphenyl sulphone is added and, finally, hydrochloric acid is added until the pH of the mixture is 9. The copper complex of the above formula is formed. On completion of the coupling, this is precipitated by heating the reaction mixture to 50° and adding sodium chloride. The dyestuff is filtered off, washed with dilute sodium chloride solution and dried. It is then a blue-black powder which dyes wool from an acetic acid bath in blue shades which are light fast and have good fastness to sea water.

The tetrazonium compound mentioned is produced by dissolving 16.8 g. of 3,3'-diamino-4,4'-dicarboxy-diphenyl sulphone and 6.9 g. of sodium nitrite in 100 ml. of 1 N sodium hydroxide solution and adding the solution dropwise to a mixture of 30 ml. of 10 N hydrochloric acid and sufficient ice to keep the temperature at 0–10°. On completion of the tetrazotisation, the excess nitrite is decomposed with sulphamic acid and the suspension is neutralised until congo paper is no longer turned blue.

dropwise, then a diazonium suspension from 18.7 g. of 1-hydroxy-2-aminobenzene-4-methyl sulphone produced by direct diazotisation by methods known per se is added and, finally, hydrochloric acid is added until the pH of the mixture is 9. The mixture is then stirred overnight. The dyestuff of the above formula is formed. It is filtered off, washed with dilute sodium chloride solution and dried.

It is a blue-black powder which dyes wool from a neutral or acetic acid bath in light fast blue shades which have good fastness to milling and washing.

Example 3

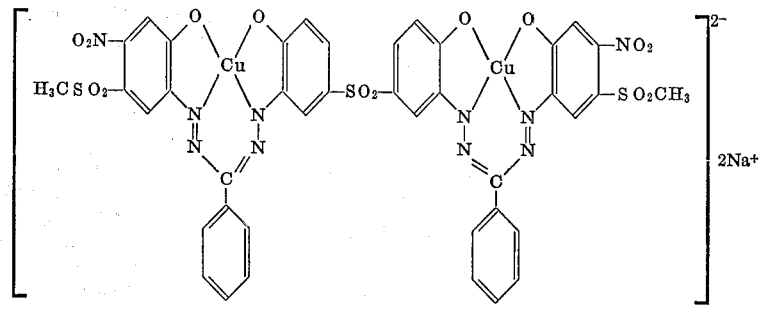

32.2 g. of 1-hydroxy-2-amino-5-nitrobenzene-4-methyl sulphone are diazotised at 0–10° with 30 ml. of 10 N hydrochloric acid and 6.9 g. of sodium nitrite, with the addition of ice. On completion of the diazotisation, the mixture is neutralised with sodium bicarbonate until congo paper is no longer turned blue. This diazonium suspension is added at 0–10° to a solution of 20 g. of phenyl formyl acetic acid ethyl ester in 200 ml. of ethanol and 10 ml. of 10 N sodium hydroxide solution and further sodium hydroxide solution is added to the mixture until the pH is 9–10. The mixture is stirred until the coupling is complete. It is then heated to 50°, 70 ml. of 10 N sodium hydroxide solution are added to the mixture and the temperature is kept for 30 minutes at 50–55°. The solution is then cooled to room temperature and then 16.8 g. of tartaric acid are added, then 100 ml. of 1 m.

Example 2

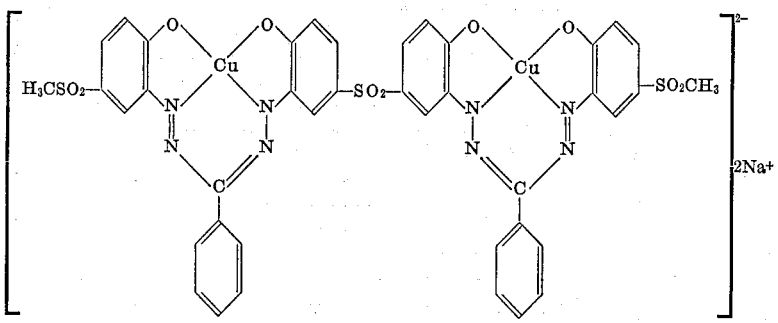

14 g. of 3,3'-diamino-4,4'-dihydroxy-diphenyl sulphone are dissolved in 40 ml. of water and 15 ml. of 10 N hydrochloric acid and, while adding ice, the solution is tetrazotised at 0–10° with a solution of 6.9 g. of sodium nitrite. The brown suspension of the tetrazonium compound is neutralised with sodium bicarbonate until congo paper is no longer turned blue. It is then added to a solution of 20 g. of phenyl formyl acetic acid ethyl ester in 200 ml. of ethanol and 10 ml. of 10 N sodium hydroxide solution. The mixture is kept alkaline by the addition of sodium hydroxide solution. On completion of the coupling, the mixture is heated to 50°, 70 ml. of 10 N sodium hydroxide solution are added and it is stirred for 30 minutes at 50–55°. It is then cooled to room temperature whereupon 16.8 g. of tartaric acid are added, then 100 ml. of 1 m. copper sulphate solution are added copper sulphate solution are added dropwise, then the tetrazonium compound from 14 g. of 3,3'-diamino-4,4'-dihydroxydiphenyl sulphone (produced analogously to the tetrazonium compound given in Example 1, paragraph 3) is added and, finally, hydrochloric acid is added until the pH of the mixtuer is 9. The whole is stirred for several hours, heated slowly to 50° and stirred until the tetrazonium compound has completely reacted.

The copper complex of the above formula is formed. It is precipitated completely by the addition of sodium chloride, filtered off, washed with dilute sodium chloride solution and dried. It is a black powder which dyes wool from a neutral or acetic acid bath in blue-green shades having very good fastness to light and wet.

By reduction of the nitro groups in the above dyestuff there is obtained the corresponding diamino derivative.

TABLE I

| Example No. | Diazo component | Tetrazo component | Coupling component | Metal | Shade on wool |
|---|---|---|---|---|---|
| 4 | 1-hydroxy-2-aminobenzene-4-methylsulphone. | 4,4'-dihydroxy-3,3'-diaminodiphenyl sulphone. | Phenyl-formyl acetic acid ethyl ester. | Cu | Blue. |
| 5 | 1-hydroxy-2-aminobenzene-4-sulphonic acid amide. | ...do... | ...do... | Cu | Do. |
| 6 | ...do... | ...do... | ...do... | Ni | Brown-violet. |
| 7 | 2-aminobenzoic acid-5-sulphonic acid amide. | ...do... | ...do... | Cu | Blue. |
| 8 | 1-bis-(methylsulphonyl)-amino-2-aminobenzene (and saponification after the coupling). | ...do... | ...do... | Cu | Do. |
| 9 | 1-hydroxy-2-aminobenzene-4-methylsulphone (50%) plus 1-hydroxy-2-aminobenzene-4-sulphonic acid amide (50%). | ...do... | ...do... | Cu | Do. |
| 10 | 1-hydroxy-2-amino-4-(N-methyl-N-acetylamino)-benzene. | ...do... | ...do... | Cu | Do. |
| 11 | 1-hydroxy-2-amino-4-(3'-sulphamoylphenylsulphonyl)-benzene. | ...do... | ...do... | Cu | Do. |
| 12 | 1-hydroxy-2-amino-4-(3'-sulphophenyl-sulphonyl)-benzene. | ...do... | ...do... | Cu | Do. |
| 13 | 1-hydroxy-2-amino-4-(3'-sulphamoylphenylsulphonyl)-benzene (50%) plus 1-hydroxy-2-aminobenzene-4-methylsulphone (50%). | ...do... | ...do... | Cu | Do. |
| 14 | 1-hydroxy-2-amino-4-(3'-sulphamoylphenylsulphonyl)-benzene (50%) plus 1-hydroxy-2-amino-4-[N-(4'-sulphophenyl)-N-ethyl-sulphamoyl]-benzene (50%). | ...do... | ...do... | Cu | Do. |
| 15 | 6-nitro-1-hydroxy-2-aminobenzene-4-methylsulphone. | ...do... | ...do... | Cu | Blue-green. |
| 16 | 6-nitro-1-hydroxy-2-aminobenzene-4-methylsulphone (50%) plus 1-hydroxy-2-aminobenzene-4-methylsulphone (50%). | ...do... | ...do... | Cu | Blue. |
| 17 | 1-hydroxy-2-aminobenzene-4-methylsulphone. | 3,3'-diaminodiphenylsulphone-4,4'-dicarboxylic acid. | ...do... | Cu | Do. |
| 18 | 1-hydroxy-2-aminobenzene-4-sulphonic acid amide. | ...do... | ...do... | Cu | Do. |
| 19 | 1-hydroxy-2-aminobenzene-4-phenylsulphone-3'-sulphonic acid amide. | ...do... | ...do... | Cu | Do. |
| 20 | 5-nitro-1-hydroxy-2-aminobenzene-4-methylsulphone. | ...do... | ...do... | Cu | Blue-green. |
| 21 | 6-nitro-1-hydroxy-2-aminobenzene-4-methylsulphone. | ...do... | ...do... | Cu | Do. |
| 22 | 1-hydroxy-2-amino-4-methylsulphonyl-benzene. | 4,4'-dihydroxy-3,3'-diaminodiphenylmethane. | ...do... | Cu | Blue. |
| 23 | 1-hydroxy-2-aminobenezene-4-sulphonic acid amide. | ...do... | ...do... | Cu | Do. |
| 24 | 1-hydroxy-2-amino-4-(3'-sulphamoylphenylsulphonyl)-benzene. | ...do... | ...do... | Cu | Do. |
| 25 | 5-nitro-1-hydroxy-2-amino-4-methylsulphonyl-benzene. | ...do... | ...do... | Cu | Blue-green. |
| 26 | 6-nitro-1-hydroxy-2-amino-4-methylsulphonyl-benzene. | ...do... | ...do... | Cu | Do. |
| 27 | 1-hydroxy-2-amino-4-methylsulphonylbenzene. | 4,4'-diaminodiphenylmethane-3,3'-dicarboxylic acid. | ...do... | Cu | Blue. |
| 28 | 1-hydroxy-2-amino-4-sulphamoyl-benzene. | ...do... | ...do... | Cu | Do. |
| 29 | 1-hydroxy-2-amino-4-(3'-sulphamoylphenylsulphonyl)-benzene. | ...do... | ...do... | Cu | Do. |
| 30 | 5-nitro-1-hydroxy-2-amino-4-methylsulphonyl-benzene. | ...do... | ...do... | Cu | Blue-green. |
| 31 | 6-nitro-1-hydroxy-2-amino-4-methylsulphonyl-benzene. | ...do... | ...do... | Cu | Do. |
| 32 | 1-hydroxy-2-aminobenzene-4-methylsulphone. | 4,4'-dihydroxy-3,3'-diaminodiphenylsulphone. | α-Naphthyl-formyl acetic acid methyl ester. | Cu | Blue. |
| 33 | 5-nitro-1-hydroxy-2-amino-4-methylsulphonyl-benzene. | ...do... | ...do... | Cu | Blue-green. |
| 34 | 1-hydroxy-2-amino-4-methylsulphonyl-benzene. | ...do... | Benzylformyl acetic acid ethyl ester. | Cu | Violet. |
| 35 | 5-nitro-1-hydroxy-2-amino-4-methylsulphonyl-benzene. | ...do... | ...do... | Cu | Blue-grey. |
| 36 | 1-hydroxy-2-amino-4-methylsulphonyl-benzene. | ...do... | Phenylthioformyl acetic acid ethyl ester. | Cu | Grey. |
| 37 | 1-hydroxy-2-amino-4-[N-(4'-sulphophenyl)-N-ethylsulphamoyl]-benzene. | 3,3'-diaminodiphenylsulphone. | Phenyl-formyl acetic acid ethyl ester. | Cu | Blue. |
| 38 | ...do... | 4,4'-diaminodiphenylsulphone. | ...do... | Cu | Do. |
| 39 | ...do... | 4,4'-diaminodiphenylsulphide. | ...do... | Cu | Blue-green. |
| 40 | 1-hydroxy-2-amino-4-methylsulphonyl-benzene. | 4,4'-dihydroxy-3,3'-diaminobenzophenone. | ...do... | Cu | Blue. |
| 41 | 1-hydroxy-2-amino-4-sulphamoyl-benzene. | ...do... | ...do... | Cu | Do. |
| 42 | 1-hydroxy-2-amino-4-(3'-sulphamoylphenylsulphonyl)-benzene. | ...do... | ...do... | Cu | Do. |
| 43 | 5-nitro-1-hydroxy-2-amino-4-methylsulphonyl-benzene. | ...do... | ...do... | Cu | Blue-green. |
| 44 | 6-nitro-1-hydroxy-2-amino-4-methylsulphonyl-benzene. | ...do... | ...do... | Cu | Do. |
| 45 | 1-hydroxy-2-aminobenzene-4-methylsulphone. | N,N'-di-(3-amino-4-hydroxyphenylsulphonyl)-ethylenediamine. | ...do... | Cu | Blue. |
| 46 | 5-nitro-1-hydroxy-2-amino-4-methylsulphonyl-benzene. | ...do... | ...do... | Cu | Blue-green. |
| 47 | ...do... | N,N'-di-(3'-amino-4'-hydroxyphenylsulphonyl)-propylene-1,3-diamine. | ...do... | Cu | Do. |
| 48 | 1-hydroxy-2-amino-4-[N-(4'-sulphophenyl)-N-ethyl-sulphamoyl]-benzene. | 4,4'-dichloro-3,3'-diaminodiphenylsulphone. | ...do... | Cu | Blue. |
| 49 | ...do... | 4,4'-dibromo-3,3'-diaminodiphenylsulphone. | ...do... | Cu | Do. |
| 50 | ...do... | 4,4'-dimethyl-3,3'-diaminodiphenylsulphone. | ...do... | Cu | Do. |
| 51 | 4-amino-1-methylsulphonylbenzene. | 4,4'-dihydroxy-3,3'-diaminodiphenylsulphone. | ...do... | Cu | Do. |

TABLE I—Continued

| Example No. | Diazo component | Tetrazo component | Coupling component | Metal | Shade on wool |
|---|---|---|---|---|---|
| 52 | 1-[bis-(phenylsulphonyl)-amino]-2-aminobenzene (and saponification after the coupling). | do | do | Cu | Do. |
| 53 | 1-[bis-(4'-methylsulphonyl)-amino]-2-aminobenzene (and saponification after the coupling). | do | do | Cu | Do. |
|  |  | do | do | Cu | Do. |
| 54 | 1-amino-2-hydroxy-naphthalene-4-sulphonic acid. | do | do | Cu | Blue-green. |
| 55 | 1-amino-2-chloro-benzene-4-sulphonic acid. | do | do | Cu | Blue. |
| 56 | 1-amino-2-bromo-benzene-4-sulphonic acid. | do | do | Cu | Do. |
| 57 | 1-amino-2-methyl-benzene-5-sulphonic acid. | do | do | Cu | Do. |
| 58 | 1-hydroxy-2-amino-4-phenylsulbenzene. | 4-[N-(2'-hydroxy-3-amino-5-sulpho-phenyl)-sulphamoyl]-2-amino-1-hydroxy-benzene. | do | Cu | Do. |
| 59 | 1-hydroxy-2-amino-4-acetyl-benzene. | 4,4'-dihydroxy-3,3'-diaminodiphenyl sulphone. | do | Cu | Do. |
| 60 | 1-hydroxy-2-amino-4-(N-methyl-N-methylsulphonyl-amino)-benzene. | do | do | Cu | Do. |
| 61 | 1-amino-2,3-dicarboxy-benzene | do | do | Cu | Do. |

Example 62

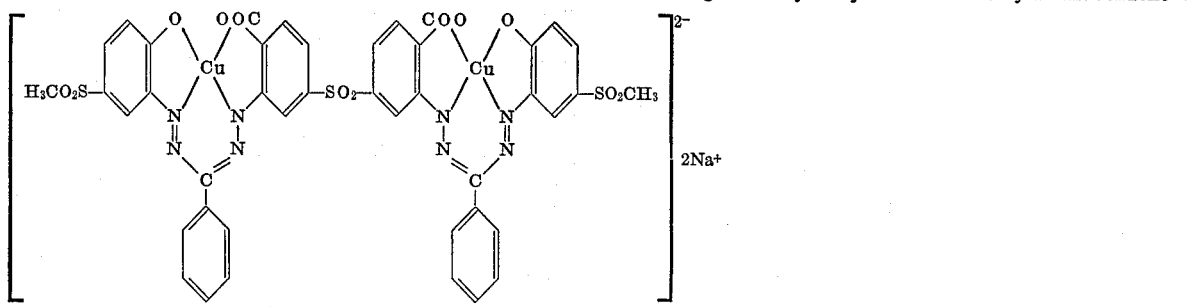

16.8 g. of 3,3'-diamino-4,4'-dicarboxy-diphenylsulphone are tetrazotised at 0–10° with 6.9 g. of sodium nitrite and 50 ml. of 10 N hydrochloric acid. The tetrazonium salt suspension is then neutralised with sufficient sodium bicarbonate to make congo paper no longer turn blue.

29 g. of the hydrazone from 1-hydroxy-2-hydrazinobenzene-4-methylsulphone and benzaldehyde are dissolved in 500 ml. of ethanol and 500 ml. of water, the neutralised suspension of the tetrazonium salt is added at 0–10° and the mixture is made alkaline with sodium hydroxide solution. It is stirred until the coupling is complete and then, first, the solution of 28.2 g. of potassium sodium tartrate and afterwards the solution of 25 g. of copper sulphate pentahydrate are added. It is again made alkaline with sodium hydroxide solution. The whole is heated to 60–70° and stirred at this temperature until the copper complex of the above formula has been completely formed. It is then cooled to room temperature, the dyestuff is precipitated by the addition of sodium chloride, filtered off and dried. It is a blue-black powder which dyes wool from an acetic acid bath in light fast shades which have good fastness properties to sea water.

Example 63

24.6 g. of 1-hydroxy-2-amino-6-acetylaminobenzene-4-sulphonic acid are indirectly diazotised in the known way with 6.9 g. of sodium nitrite and 30 g. of concentrated hydrochloric acid and coupled, in alkaline aqueous-alcoholic solution, with 20 g. of phenylformyl acetic acid ethyl ester. The mixture is made alkaline until mimosa paper turns red and is stirred for 30 minutes at 50–55°. An alkaline solution of the copper-ditartrato complex containing 6.35 g. of copper is then added. The copper complex formed is coupled at 10–20° with the tetrazonium compound from 14 g. of 3,3'-diamino-4,4'-dihydroxydiphenyl sulphone. The reaction mixture is kept weakly alkaline during the coupling by the addition of sodium carbonate. As soon as the coupling is complete, the temperature is raised to 90° and sufficient concentrated aqueous sodium hydroxide solution is added to the copper complex dyestuff solution formed that the concentration of lye is 5%. The mixture is then stirred for several hours at 90–100° to saponify the acetylamino group, after which the copper-containing bis-aminoformazane dyestuff formed is precipitated by the addition of sodium chloride, filtered off and washed with sodium chloride solution. The filter residue is then dissolved in 30–35° warm water and an aqueous dispersion of 32.2 g. of the condensation product from 1 mol of cyanuric chloride and

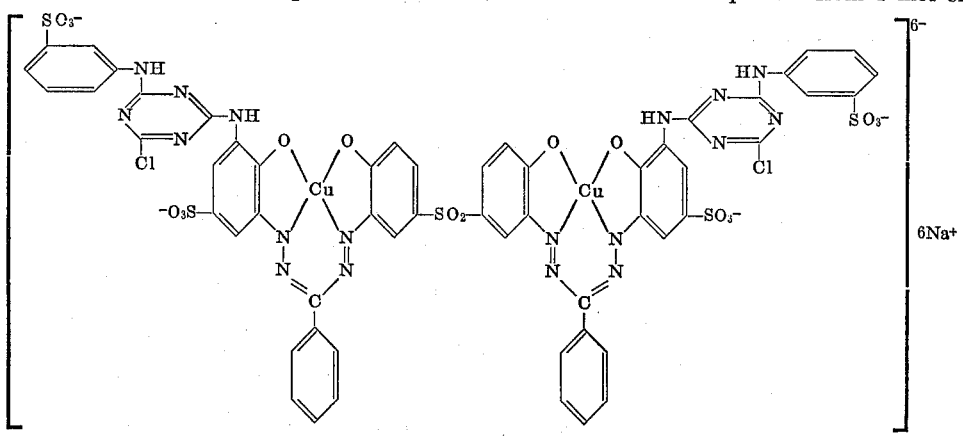

1 mol of m-aminobenzene sulphonic acid is added. The mixture is stirred for several hours at 30–35° while maintaining the pH at 6.5–7.0 by the addition of a sodium carbonate solution. On completion of the reaction, the reactive dyestuff formed is precipitated with sodium chloride, filtered off, washed with sodium chloride solution and dried in vacuo at 60–70°.

It is a blue-black powder which dissolves in water with a blue colour. It dyes cotton and regenerated cellulose fibres in the presence of an acid binding agent in blue-green shades which after soaping for 10 minutes, are very light and wet fast.

Reactive dyestuffs of similar good dyeing properties on wool and cotton are obtained by repeating Example 63 but using in lieu of the cyanuric chloride/m-amino-benzene sulphonic acid condensation product an equivalent amount of each of the following reactants: acryloyl chloride, chloroacetyl chloride, bromoacetyl chloride, methacryloyl chloride, α-chloro-acryloyl chloride, β-chloro-acryloyl chloride, β-bromo-acryloyl chloride, α,β-dichloro-acryloyl, chloride, α,β-dibromo-acryloyl chloride, 2,4,6 - trichoro-s-triazine, 2,4 - dichloro-pyrimidine-5-carboxylic acid chloride, 2,4-dichloro-6-methylamino-s-triazine, 2,4-dichloro-6-methoxy-s-triazine, 2,4,6-tribromo-s-triazine, 2,4,6-trifluoro-s-triazine, 2,4,6-tribromo-pyrimidine, 2,4,5,6-tetrabromo-pyrimidine, 2,4,5,6-tetrachloro-pyrimidine, 2,4,6-trifluoro-pyrimidine, 2,4-dibromo-pyrimidine-6-carboxylic acid chloride, 2,4-difluoro-pyrimidine-6-carboxylic acid chloride, 2,4,6-trichloro-pyrimidine.

Similar reactive dyestuffs are also obtained by repeating Example 63, but using first in lieu of the aforesaid condensation product an equivalent amount of:

2,3-dichloro-quinoxaline-6-carboxylic acid chloride,
2,3-dichloro-quinoxaline-6-sulphonyl chloride,
1,4-dichloro-phthalazine-6-carboxylic acid chloride,
2,4-dichloro-quinazoline-6-carboxylic acid chloride,
2,4-dichloro-quinazoline-7-carboxylic acid chloride,
[4′,5′-dichloro-6′-pyridazonyl-(1′)]-acetyl chloride,
p-[4′,5′-dichloro-6′-pyridazonyl-(1′)]-benzoyl chloride.

Similar reactive dyestuffs are also obtained by repeating Example 63, but using first in lieu of the aforesaid condensation product an equivalent amount of 2,4,6-trichloro-s-triazine and then reacting the resulting dyestuff with an equivalent amount of (a) trimethylamine, or (b) N,N-dimethyl-hydrazine, or (c) diaza-di-cyclo-octane, or (d) pyridine to form the dyestuffs having the reactive groupings

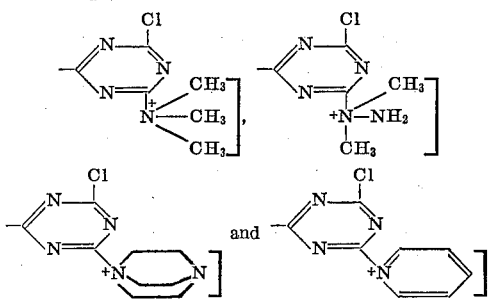

respectively, of first using 2,4-dibromo-pyrimidine-6-carboxylic acid chloride, or 2,4,6-trichloro-pyrimidine, or 2,4-dichloro-pyrimidine-5-carboxylic acid chloride and then reacting the resulting dyestuff with the above-employed quaternizing agents (a) through (d), thereby obtaining the correspondingly substituted derivatives having the quaternary nitrogen, in the case of the s-triazinyl, the pyrimidine-5-carbonyl radicals and the pyrimidine-6-carbonyl radical, in 4-position at the pyrimidine nucleus.

Non-reactive dyestuffs of similar good dyeing properties on wool as the dyestuff of Example 1 are obtained by repeating Example 63, but using in lieu of the aforesaid condensation product an equivalent amount of benzoyl chloride, 4-chloro-benzoyl chloride, 4-bromo-benzoyl chloride or 4-methyl-benzoyl chloride.

Example 64

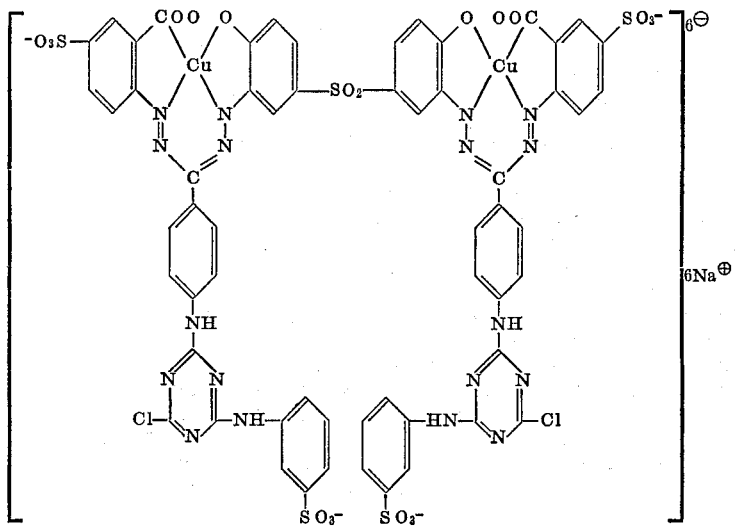

To 40 g. of the arylhydrazone obtained by condensing an equivalent amount of 2 - carboxy - 4 - sulphophenyl-hydrazine with 4-acetylamino-benzaldehyde (neutral solution in 500 ml. of water) 30 g. of sodium bicarbonate are added. The tetrazonium salt suspension obtained by tetrazotising 14 g. of 3,3′-diamino-4,4′-dihydroxydiphenyl-sulphone by the same procedure as described in Example 1, as well as 100 ml. of a 1-molar aqueous copper sulphate solution are slowly added to the aforesaid aryl hydrazone solution during one hour while maintaining the temperature of the mixture at 20–25°. As soon as the coupling reaction is complete, the temperature is raised to 90° and the reaction mixture is further worked up in exactly the same manner as described in Example 63.

The fiber-reactive dyestuff of the above formula is obtained as a blue-black powder of similar good dyeing properties on cotton and regenerated cellulose as the dyestuff of Example 63.

Other dyestuffs of similar properties are obtained by repeating Example 64, but employing in lieu of the 32.2 g. of the condensation product of cyanuric chloride and m-aminobenzene-sulphonic acid an equivalent amount of one of the following compounds:

2,4-dichloropyrimidine-6-carboxylic acid chloride,
2,4,5,6-tetrachloropyrimidine,
2,4-dichloropyrimidine-5-carboxylic acid chloride, or
2,4,6-trichloro-s-trazine.

Example 65

2 parts of the copper-containing dyestuff produced according to Example 3 and 3 parts of ammonium sulphate are dissolved in 4000 parts of water and, at 40–50°, 100 parts of previously well wetted wool are introduced into the dyebath. The bath is brought to the boil within half an hour, kept at the boil for 45 minutes and the wool is rinsed with cold water and dried. The blue-green dyeing obtained has very good fastness to light, sea water, milling and washing.

We claim:
1. A bis-formazane of the formula:

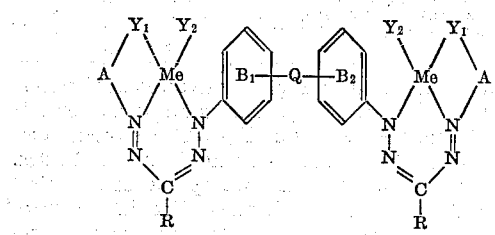

wherein
Me represents copper or nickel;
A represents a phenylene radical linked to $Y_1$ in ortho-position to the group $-N\leqslant$, said phenylene radical being substituted as follows:
  (a) by a first substituent selected from: hydrogen, chlorine, bromine, lower alkyl, lower alkylsulfonyl, phenylsulfonyl, sulfamoylphenylsulfonyl, phenylsulfonyl substituted by

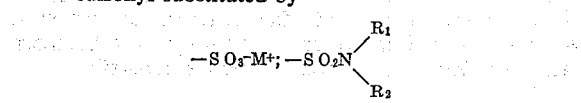

wherein $R_1$ represents hydrogen or lower alkyl and $R_2$ represents hydrogen or phenyl substituted by $-SO_3^-M^+$; $-COO^-M^+$; lower alkanoyl and

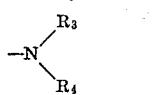

wherein $R_3$ is hydrogen or lower alkyl and $R_4$ is lower alkylsulfonyl, lower alkanoyl, benzoyl, chlorobenzoyl, bromobenzoyl or lower alkylbenzyl;
  (b) by a second substituent selected from: hydrogen, nitro and $-SO_3^-M^+$,
or A represents a 1,2-naphthylene radical substituted by $-SO_3^-M^+$;
any substituent of the phenylene radicals $B_1$ and $B_2$ is selected from hydrogen, chlorine, bromine, lower alkyl and $-SO_3^-M^+$;
$Y_1$ represents a substituent selected from hydrogen, $-O-$, $-COO-$, lower alkylsulfonylimino, phenylsulfonylimino and lower alkyl-phenylsulfonylimino;
$Y_2$ represents
  (i) a substituent selected from hydrogen, $-O-$ and $-COO-$ when $Y_1$ represents hydrogen, $-O-$, lower alkylsulfonylimino, phenylsulfonylimino or lower alkylphenylsulfonylimino, or
  (ii) $-O-$ when $Y_1$ represents $-COO-$,
the total number of hydrogen substituents represented by $Y_1$ and $Y_2$ being at most 2;

Q represents a bridging member selected from $-SO_2-$, $-S-$, $-SO_2NH$-alkylene-$NHSO_2-$ wherein alkylene has from 2 to 3 carbon atoms, $-SO_2NH-$, $-CO-$ and $-CH_2-$;
R represents a substituent selected from phenyl, phenyl substituted by $-SO_3^-M^+$, naphthyl, lower phenylalkyl and phenylthio;
$M^+$ represents a colorless cation, the total number of groupings $-SO_3M^+$ and $-COO^-M^+$ together ranging from 0 to 2,
and the two negative charges of the above formula which result when $Y_1$ and $Y_2$ represent a substituent other than hydrogen, being neutralized by two cations $M^+$.

2. A bis-formazane as defined in claim 1, wherein $Y_1$ represents a substituent selected from $-O-$, $-COO-$, lower alkylsulfonylimino, phenylsulfonylimino and lower alkylphenylsulfonylimino and $Y_2$ represents
  (i) $-O-$ or $-COO-$ when $Y_1$ represents $-O-$, lower alkylsulfonylimino, phenylsulfonylimino or lower alkylphenylsulfonylimino, or
  (ii) $-O-$ when $Y_1$ represents $-COO-$.

3. A bis-formazane of the formula

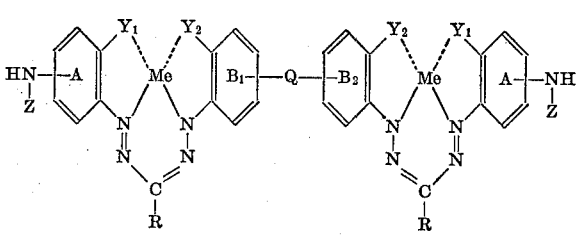

wherein
Me represents copper or nickel;
any substituent of the phenylene radical A is selected from hydrogen and $-SO_3^-M^+$;
any substituent of the phenylene radicals $B_1$ and $B_2$ is selected from hydrogen, chlorine, bromine, lower alkyl and $-SO_3^-M^+$;
$Y_1$ represents a substituent selected from $-O-$ and $-COO-$, lower alkylsulfonylimino, phenylsulfonylimino and lower alkylphenylsulfonylimino;
$Y_2$ represents
  (i) a substituent selected from $-O-$ and $-COO-$ when $Y_1$ represents $-O-$, lower alkylsulfonylimino, phenylsulfonylimino or lower alkylphenylsulfonylimino, or
  (ii) $-O-$ when $Y_1$ represents $-COO-$,
Q represents a bridging member selected from $-SO_2-$ and $-CO-$;
R represents a substituent, selected from phenyl, phenyl substituted by $SO_3^-M^+$, naphthyl, lower phenylalkyl and phenylthio;
Z represents a fiber-reactive radical selected from the following:
  (a) a radical of the formula

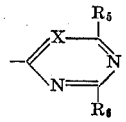

wherein X represents $-N=$, $=CH$, $=CCl$ or $=CBr$, and when X is $=N-$,
$R_5$ represents chlorine, bromine, fluorine, tri-lower alkylammonio, a group of the formula

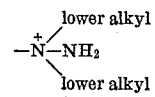

the radical $$-\overset{+}{N}\diagup\hspace{-0.5em}=\hspace{-0.5em}\diagdown N$$

or the radical $$-\overset{+}{N}\diagup\hspace{-0.5em}=\hspace{-0.5em}\diagdown$$

$R_6$ represents the same as $R_5$, lower alkoxy, mono-lower alkylamino or phenylamino substituted by $-SO_3^-M^+$; and
when X is $$=\overset{|}{C}H, \; =\overset{|}{C}Cl \; \text{or} \; =\overset{|}{C}Br$$

each of $R_5$ and $R_6$ represent chlorine, bromine or fluorine;

(b) a radical of one of the formulas

[structures with $R_5'$, $R_6'$, $R_6''$]

wherein each $R_5'$ and $R_6'$ represents chlorine, bromine, fluorine, tri-lower alkyl-ammonio, a group of the formula $$-\overset{+}{N}\diagdown\text{lower alkyl} \atop -NH_2 \atop \text{lower alkyl}$$

the radical $$-\overset{+}{N}\diagup\hspace{-0.5em}=\hspace{-0.5em}\diagdown N$$

or the radical $$-\overset{+}{N}\diagup\hspace{-0.5em}=\hspace{-0.5em}\diagdown$$

$R_6''$ represents chlorine, bromine or fluorine;
(c) 2,3-dichloro-quinoxaline-6-carbonyl;
(d) 2,3-dichloro-quinoxaline-6-sulfonyl;
(e) 1,4-dichloro-phthalazine-6-carbonyl;
(f) 2,4-dichloro-quinazoline-6-carbonyl;
(g) 2,4-dichloro-quinazoline-7-carbonyl;
(h) [4',5'-dichloro-6'-pyridazonyl-(1')]-lower alkanoyl;
(i) p-[4',5'-dichloro-6'-pyridazonyl-(1')]-benzoyl;
(k) α-chloro- or α-bromo-lower alkanoyl;
(l) α,β-dichloro- or α,β-dibromo-lower alkanoyl;
(m) lower alkenoyl;
(n) mono-chloro- or mono-bromo-lower alkenoyl; and
(o) dichloro- r dibromo-lower alkenoyl; and
$M^+$ represents a colorless cation, the total number of groupings $-SO_3^-M^+$ together ranging from 2 to 6, and the two negative charges of the above formula which result from $Y_1$ and $Y_2$, and when Z contains no quaternized nitrogen atoms, being neutralized by two cations $M^+$.

4. A bis-formazane of the formula

[bis-formazane structure with $Y_1$, $Y_2$, A, Me, $B_1$, Q, $B_2$, HN-Z, NH-Z]

wherein
Me represents copper or nickel;

any substituent of the phenylene radical A is selected from hydrogen and $-SO_3^-M^+$;
any substituent of the phenylene radicals $B_1$ and $B_2$ is selected from hydrogen, chlorine, bromine, lower alkyl and $-SO_3^-M^+$;
$Y_1$ represents a substituent selected from $-O-$, $-COO-$, lower alkylsulfonylimino, phenylsulfonylimino and lower alkylphenylsulfonylimino;
$Y_2$ represents
(i) a substituent selected from $-O-$ and $-COO-$ when $Y_1$ represents $-O-$, lower alkylsulfonylimino, phenylsulfonylimino, or lower alkylphenylsulfonylimino, or
(ii) $-O-$ when $Y_1$ represents $-COO-$;
Q represents a bridging member selected from $-SO_2-$ and $-CO-$;
Z represents a fiber-reactive radical selected from the following:
(a) a radical of the formula

[pyrimidine structure with X, $R_5$, $R_6$]

wherein X represents $$-N=, \; =\overset{|}{C}H, \; =\overset{|}{C}Cl, \; \text{or} \; =\overset{|}{C}Br$$

and when X is $-N=$,
$R_5$ represents chlorine, bromine, fluorine, tri-lower alkyl-ammonio, a group of the formula $$-\overset{+}{N}\diagdown\text{lower alkyl} \atop -NH_2 \atop \text{lower alkyl}$$

the radical $$-\overset{+}{N}\diagup\hspace{-0.5em}=\hspace{-0.5em}\diagdown N$$

or the radical $$-\overset{+}{N}\diagup\hspace{-0.5em}=\hspace{-0.5em}\diagdown$$

$R_6$ represents the same as $R_5$, lower alkoxy, mono-lower alkylamino or phenylamino substituted by $-SO_3^-M^+$;
and when X is $$=\overset{|}{C}H, \; =\overset{|}{C}Cl \; \text{or} \; =\overset{|}{C}Br$$

each of $R_5$ and $R_6$ represent chlorine, bromine or fluorine;

(b) a radical of one of the formulas

[structures with $R_5'$, $R_6'$, $R_6''$]

wherein each of $R_5'$ and $R_6'$ represents chlorine, bromine, fluorine, tri-lower alkyl-ammonio, a group of the formula $$-\overset{+}{N}\diagdown\text{lower alkyl} \atop -NH_2 \atop \text{lower alkyl}$$

the radical $$-\overset{+}{N}\diagup\hspace{-0.5em}=\hspace{-0.5em}\diagdown N$$

or the radical $$-\overset{+}{N}\diagup\hspace{-0.5em}=\hspace{-0.5em}\diagdown$$

$R_6''$ represents chlorine, bromine or fluorine;
(c) 2,3-dichloro-quinoxaline-6-carbonyl;
(d) 2,3-dichloro-quinoxaline-6-sulfonyl;

(e) 1,4-dichloro-phthalazine-6-carbonyl;
(f) 2,4-dichloro-quinazoline-6-carbonyl;
(g) 2,4-dichloro-quinazoline-7-carbonyl;
(h) [4′,5′-dichloro-6′-pyridazonyl-(1′)]-lower alkanoyl;
(i) p-[4′,5′-dichloro-6′-pyridazonyl-(1′)]-benzoyl;
(k) α-chloro- or α-bromo-lower alkanoyl;
(l) α,β-dichloro- or α,β-dibromo-lower alkanoyl;
(m) lower alkenoyl;

(n) mono-chloro- or mono-bromo-lower alkenoyl; and (o) dichloro- or dibromo-lower alkenoyl; and
M$^+$ represents a colorless cation, the total number of groupings —SO$_3^-$M$^+$ together ranging from 2 to 6; and the two negative charges of the above formula which result from Y$_1$ and Y$_2$, and when Z contains no quaternized nitrogen atoms, being neutralized by two cations M$^+$.

5. A bis-formazane as defined in claim 2, wherein Q represents —SO$_2$— or —CO—.

6. A bis-formazane as defined in claim 5, which is of the formula

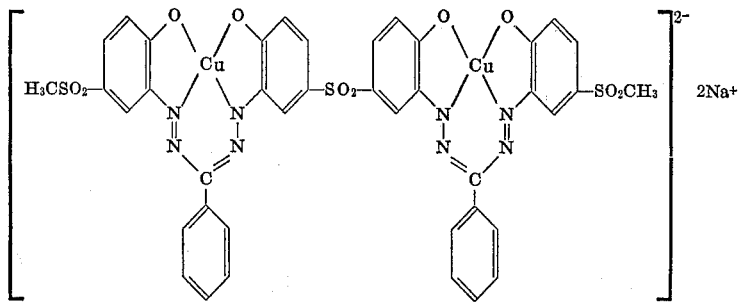

7. A bis-formazane as defined in claim 5 which is of the formula

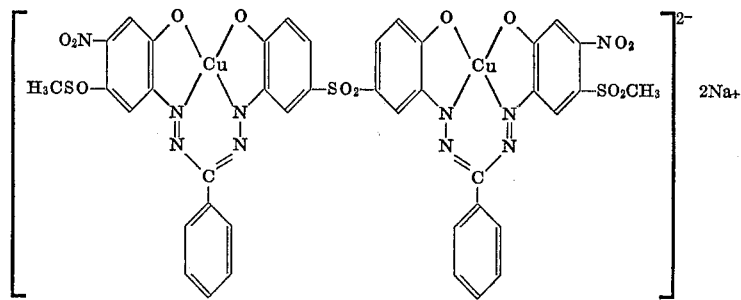

8. A bis-formazane as defined in claim 5 which is of the formula

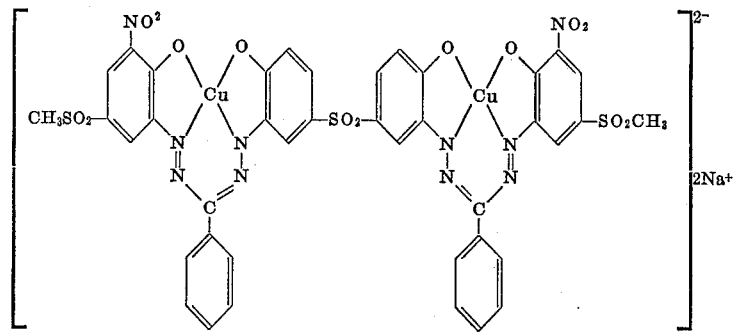

9. A bis-formazane as defined in claim 5, which is of the formula

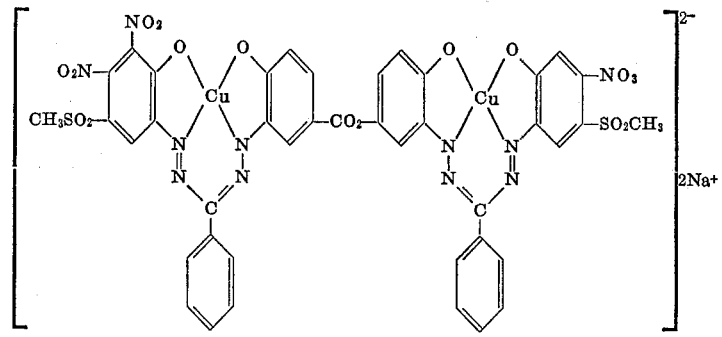

10. A bis-formazane as defined in claim 3 which is of the formula
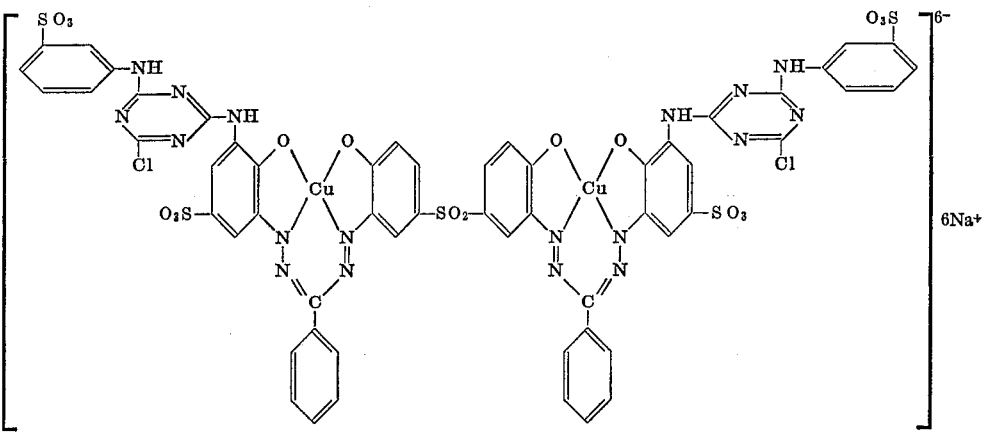
11. A bis-formazane as defined in claim 4, which is of the formula
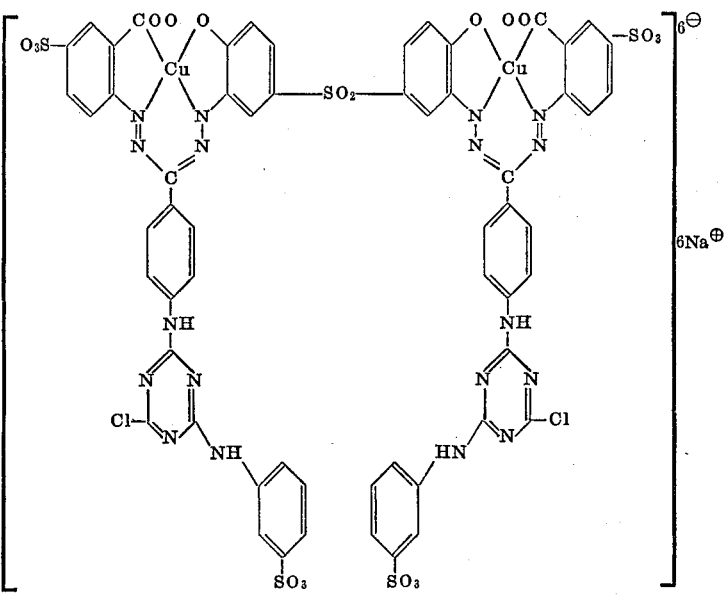
12. A bis-formazane of the formula
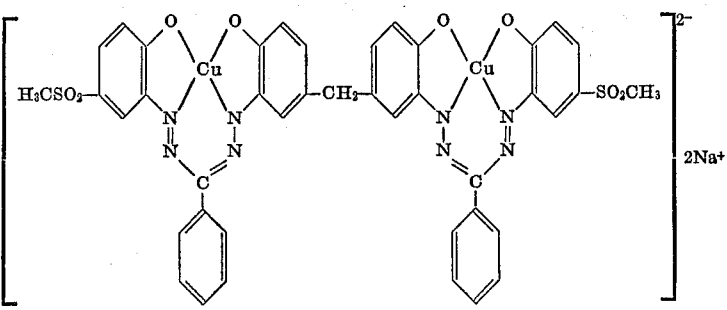
References Cited
UNITED STATES PATENTS
| | | | |
|---|---|---|---|
| 3,244,690 | 4/1966 | Steinemann | 260—148XR |
| 3,296,244 | 1/1967 | Boffa et al. | 260—148 XR |
FOREIGN PATENTS
| | | | |
|---|---|---|---|
| 950,861 | 2/1964 | Great Britain | 260—148 |
FLOYD D. HIGEL, Primary Examiner
U.S. Cl. X.R.
8—4, 7, 13, 41, 50, 63, 71; 117—138.8, 142, 143, 154; 260—37, 147, 148, 153, 154, 158, 193